Figure 2:
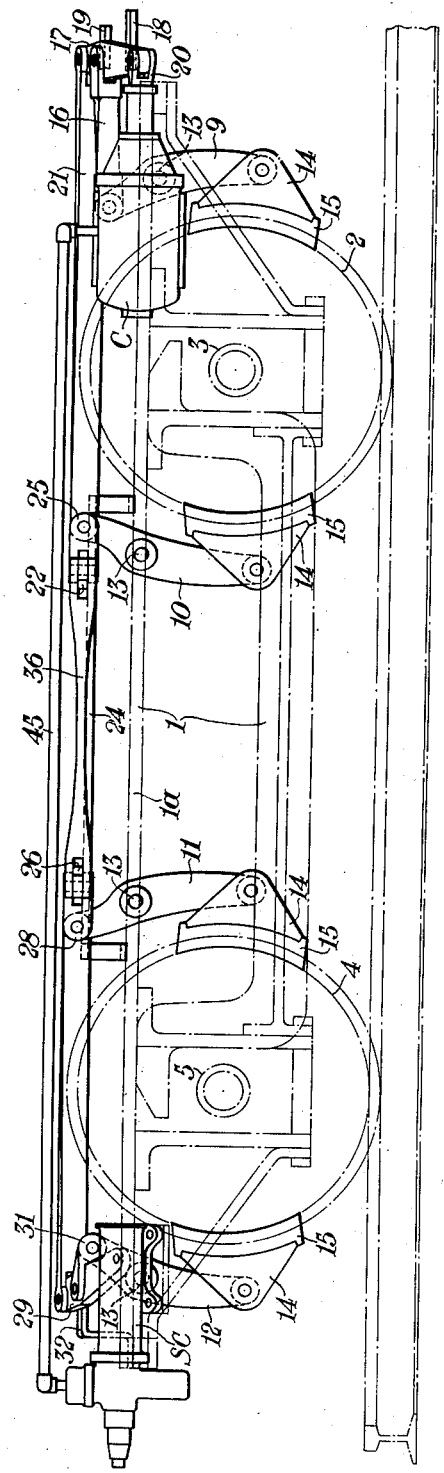

April 15, 1941.  E. G. MUELLER  2,238,744
BRAKE RIGGING
Filed Feb. 17, 1940  2 Sheets-Sheet 1
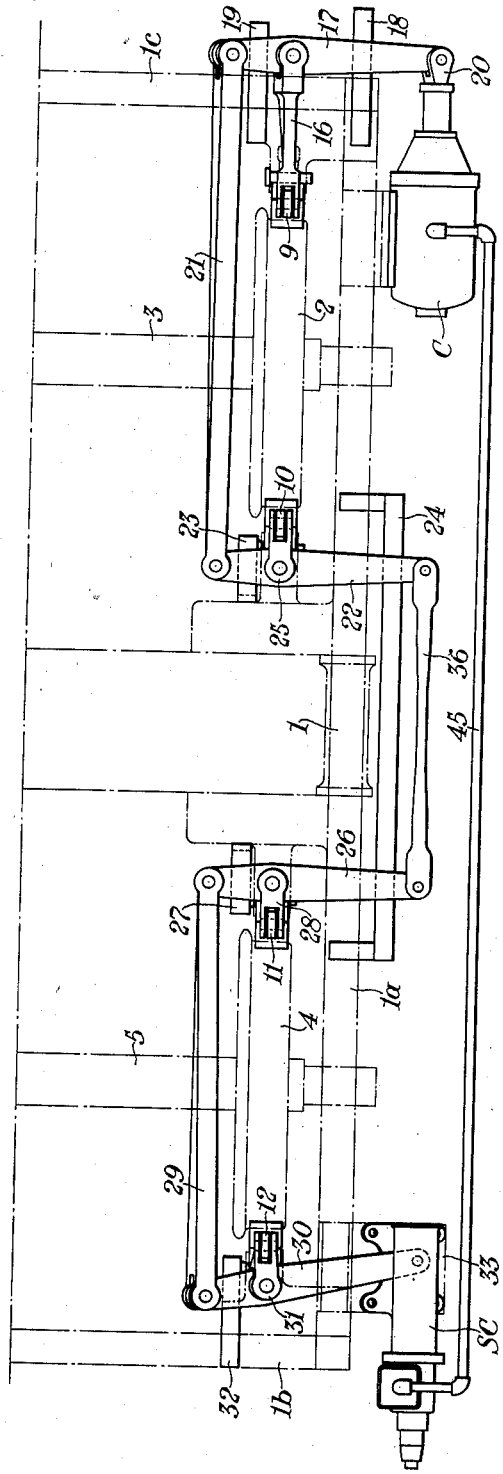
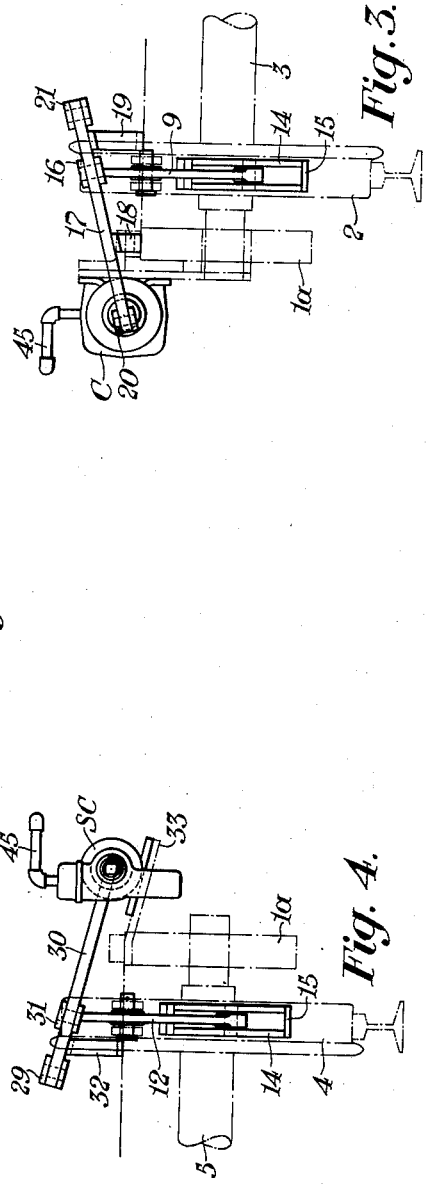
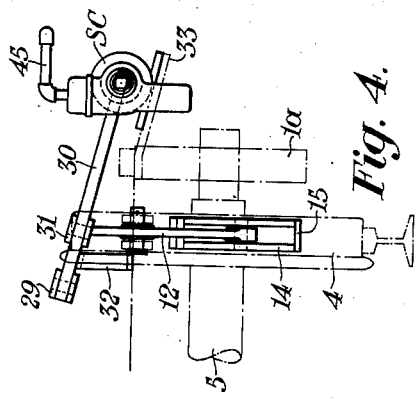
INVENTOR
Emil G. Mueller
BY
HIS ATTORNEY April 15, 1941.  E. G. MUELLER  2,238,744
BRAKE RIGGING
Filed Feb. 17, 1940  2 Sheets-Sheet 2

INVENTOR
Emil G. Mueller
BY
HIS ATTORNEY

Patented Apr. 15, 1941

2,238,744

UNITED STATES PATENT OFFICE 2,238,744

BRAKE RIGGING

Emil G. Mueller, Swissvale, Pa., assignor to The American Brake Company, Swissvale, Pa., a corporation of Missouri Application February 17, 1940, Serial No. 319,508

6 Claims. (Cl. 188—56)

My invention relates to brake rigging for railway car trucks, and particularly to brake rigging of the clasp type in which a separate set of interconnected rods and levers is located at each side of the truck.

More particularly my present invention relates to brake rigging of the type described in which the set of interconnected rods and levers at each side of the truck is operatively connected at one end of the truck with an associated brake cylinder, and at the other end of the truck with an associated automatic slack adjuster, both the brake cylinder and the slack adjuster being secured to the truck frame outboard of the wheels in positions where these devices and the connections therefrom to the other parts of the brake rigging are readily accessible for adjustment, inspection and repair or replacement.

In brake rigging of the general type outlined above as it has heretofore generally been constructed, the vertical levers which support the brake shoes at each side of each wheel have been interconnected at one end, most frequently the lower end, by a pair of rods located on opposite sides of the wheel and commonly referred to as "straddle" rods. With this construction, it is difficult to provide sufficient clearance between the straddle rods and the wheels to prevent one rod or the other from at times striking the wheels due to the pendulum effect of the straddle rods and the associated lever, and any striking is objectionable. Furthermore, the long pins required to connect the straddle rods with the associated hanger levers when sufficient clearance between the straddle rods and the wheels is provided introduces additional weight and expense in order to secure rigidity of structure.

One object of my present invention is to provide a brake rigging of the above type which is simple and compact, and which at the same time eliminates the necessity for the use of straddle rods.

According to my invention I accomplish this object by supporting the vertical levers which carry the brake shoes intermediate their ends, and by transmitting to the upper ends of the vertical levers, through the medium of horizontal levers and relatively long brake rods part of which are in compression, the forces necessary to cause the brake shoes to clasp the associated wheels.

Other objects and characteristic features of my invention will become apparent as the description proceeds.

I shall describe one form of brake rigging embodying my invention, and shall then point out the novel features thereof in claims.

In the accompanying drawings, Fig. 1 is a fragmentary plan view of a railway car truck equipped with brake rigging constructed in accordance with my present invention. Fig. 2 is a side elevational view of the car truck and brake rigging shown in Fig. 1. Figs. 3 and 4 are right and left-hand end views, respectively, of the car truck and brake rigging shown in Figs. 1 and 2.

Similar reference characters refer to similar parts in each of the several views.

Referring to the drawings, I have shown my invention applied to a four wheel car truck having a frame 1 supported at one end by a wheel and axle assembly consisting of a pair of wheels 2 mounted on an axle 3, and at the other end by a wheel and axle assembly consisting of a pair of wheels 4 mounted on an axle 5. The truck frame 1 may have any preferred construction, and as here illustrated includes a side member 1a connected to spaced end members 1b and 1c.

The brake rigging comprises two separate and independent sets of interconnected rods and levers, one set of which is located at each side of the truck. These two sets are similar in construction and function, and it is believed, therefore, that a clear understanding of both will be had from the following detailed description of the one set only. Referring to the set illustrated, this set comprises four similar hanger levers 9, 10, 11 and 12, two of which, 9 and 10, are disposed on opposite sides of the wheel 2 and the remaining two of which are disposed on opposite sides of the wheel 4. Each of these hanger levers is pivotally attached intermediate its ends to the truck frame by means of an associated pivot pin 13, and is provided at its lower end with a brake head 14 carrying a brake shoe 15 for engagement with the periphery of the associated wheel.

The upper end of the hanger lever 9 is pivotally connected to one end of a relatively short pull rod 16, the other end of which is pivotally connected with a transversely extending floating brake cylinder lever 17 intermediate its ends. The brake cylinder lever 17 is slidably supported on opposite sides of the pull rod 16 by means of spaced longitudinally extending supports 18 and 19 secured to the end member 1c of the truck frame 1, and is pivotally connected at its outer end to the push rod 20 of a brake cylinder C.

The brake cylinder C is secured to the outer side of the side member 1a of the truck adjacent the right-hand end of the truck, and comprises as usual a cylinder body, reciprocable pistons (not shown) biased to the inner end of its stroke by the usual release spring (not shown), and the push rod 20 operatively connected with the piston.

The inner end of the brake cylinder lever 17 is operatively connected through the medium of a compression rod 21 disposed inboard of the wheel 2 with the inner end of a floating transversely extending live lever 22. The live lever 22 is slidably supported adjacent its ends on spaced supports 23 and 24 secured to the truck frame, and is operatively connected intermediate its ends by means of a clevis 25 with the upper end of the hanger lever 10, and at its outer end with the outer end of the similar floating live lever 26 by means of a pull rod 36.

The live lever 26 is slidably supported adjacent its ends on the support 24 and a support 27, and is operatively connected intermediate its ends with the upper end of the hanger lever 11 by means of a clevis 28. The support 27 is similar to the support 23 and is secured to the frame 1 in the same manner as the support 23.

At its inner end the live lever 26 is operatively connected through the medium of a compression rod 29 with the inner end of a transversely extending dead lever 30. This latter lever is operatively connected intermediate its ends with the hanger lever 12 through the medium of a clevis 31, and at its outer end with an automatic slack adjuster SC. The dead lever is slidably supported between its point of connection with the clevis 31 and the compression rod 29 by means of a suitable support 32 secured to the end member 1a of the truck frame. It will be noted that the compression rod 29 is disposed inboard of the wheel 4 about the same distance that the compression rod 21 is disposed inboard of the wheel 2.

The automatic slack adjuster SC is secured through the medium of a mounting bracket 33 to the outer side of the side member 1a of the truck frame 1 at the end opposite to the brake cylinder C, and is connected to the brake cylinder by a pipe 45. This slack adjuster by itself forms no part of my present invention, and may comprise any of the well-known types which will move the effective point of connection of the outer end of the dead lever 30 toward the left a predetermined amount each time that it is supplied with air pressure.

The pipe 45 is connected with the brake cylinder at such a point that as long as no slack is present in the brake rigging the brake cylinder piston in applying the brakes will not move far enough to admit air to the pipe, but that when slack develops, the additional movement of the piston necessary to fully apply the brakes will then cause fluid pressure to be admitted to the pipe from the pressure side of the piston and will thus cause the slack adjuster to automatically take up the slack.

It will be noted that both the brake cylinder lever 17 and the dead lever 30 are inclined from the horizontal with their outer ends lower than their inner ends and that both the brake cylinder and the slack adjuster are mounted on the truck in such positions that they do not project above the top of the truck. This arrangement insures the necessary clearance between the brake rigging and the car parts, and at the same time renders the brake cylinder and slack adjuster together with the connections therefrom to the other parts of the brake rigging readily accessible for adjustment, inspection and repair or replacement.

In operation, when fluid is supplied to the brake cylinder, the push rod 20 will move outwardly and will thus move the outer end of the brake cylinder lever 17 toward the right. This movement of the brake cylinder lever will first cause the lever to fulcrum about its point of connection with the compression rod 21, and will thus act through the pull rod 16 to rotate the hanger lever 9 to the position in which the associated brake shoe 15 frictionally engages the wheel 2. As soon as the hanger lever 9 reaches this position further movement of the pull rod 16 will be prevented, and the lever 17 will then fulcrum about its point of connection with the pull rod 16, thereby causing the push rod 21 to move toward the left. This latter movement will first cause the live lever 22 to fulcrum about its point of connection with the pull rod 36, and will thus rotate the hanger lever 10 to the position in which the brake shoe 15 carried thereby frictionally engages the wheel 2, whereupon the live lever 22 will then rotate about its point of connection with the clevis 25 and will thus act through the pull rod 36 to move the outer end of the live lever 26 toward the right. During this latter movement the live lever 26 will first fulcrum about its point of connection with the push rod 29 until the hanger lever 11 is rotated to the position in which the associated brake shoe frictionally engages the wheel 4, after which it will fulcrum about its point of connection with the clevis 28 to thereby move the compression rod 29 and hence the inner end of the dead lever 30 toward the left. The outer end of the dead lever is normally constrained to rotation about its point of connection with the fulcrum block of the slack adjuster SC, and it will be apparent, therefore, that as the inner end of the dead lever moves toward the left, the hanger lever 12 will be moved to the position in which the associated brake shoe 15 frictionally engages the wheel 4. The parts are so proportioned that when the brake shoes have all moved into engagement with the wheels, the two shoes on opposite sides of each wheel will exert substantially equal and opposite braking forces as is cutomary in clasp brake designs.

Upon the fluid being vented from the brake cylinder following a brake application, the release spring in the brake cylinder will move the push rod 20 toward its retracted position, and will thus act through the associated linkage to move the brake shoes out of frictional engagement with the wheels.

It will be obvious that if slack develops in the brake rigging, the resultant additional movement of the piston of the brake cylinder C necessary to effect a brake application will act to admit air to the slack adjuster in the manner outlined hereinbefore, and the air thus admitted to the slack adjuster will cause the fulcrum block of the slack adjuster to move toward the left a sufficient amount to take up the slack.

One advantage of brake rigging embodying my invention is that relatively few parts are required, which parts are all disposed in positions where they are accessible and have ample clearances. Furthermore, the arrangement is such that a minimum number of changes in the usual truck design are required to apply the brake rigging to the truck.

Although I have herein shown and described only one form of brake rigging embodying my invention, it is understood that various changes and modifications may be made therein within the scope of the appended claims without departing from the spirit and scope of my invention.

Having thus described my invention, what I claim is:

1. A brake rigging for a four wheel truck comprising four hanger levers one pivotally attached to the truck frame intermediate its ends on each side of each wheel at one side of the truck and each provided at its lower end with means for frictionally engaging the associated wheel, a floating transversely extending brake cylinder lever operatively connected intermediate its ends with the upper end of the hanger lever at the outer side of one wheel and at its outer end with a brake cylinder secured to the truck frame, a transversely extending dead lever operatively connected intermediate its ends with the upper end of the hanger lever at the outer side of the other wheel and pivotally connected at its outer end to the truck frame, and two transversely extending live levers connected together at their outer ends and operatively connected respectively intermediate their ends with the upper ends of the two remaining hanger levers and at their inner ends with the inner end of said brake cylinder lever and the inner end of said dead lever.

2. In a truck brake rigging for a four wheel truck, the combination of a plurality of hanger levers one pivotally attached intermediate its ends to the truck frame on each side of each wheel and each provided at its lower end with a brake head carrying a brake shoe for frictional engagement with the associated wheel, a brake cylinder secured to the truck outboard of the wheels adjacent one end of the truck, a transversely extending brake cylinder lever connected at its outer end with said brake cylinder and operatively connected intermediate its ends with the upper end of the hanger lever at the outer side of the wheel at said one end of the truck, an automatic slack adjuster secured to the truck frame outboard of the wheels adjacent the other end of the truck, a dead lever pivotally attached at its outer end to the movable member of said slack adjuster and operatively connected intermediate its ends with the upper end of the hanger lever at the outer side of the wheel at said other end of said truck, a live lever connected at its inner end with the inner end of said dead lever by a compression rod and intermediate its ends to the upper end of the hanger lever at the inner side of the wheel at said other end of said truck, and another live lever connected at its outer end to the outer end of said first mentioned live lever by a pull rod and at its inner end to the inner end of said brake cylinder lever by a compression rod and operatively connected intermediate its ends with the upper end of the hanger lever at the inner side of the wheel at said one end of said truck.

3. In a truck brake rigging for a four wheel truck, the combination of four hanger levers one pivotally attached to the truck frame intermediate its ends on each side of each wheel at one side of the truck and each provided at its lower end with a brake shoe for frictionally engaging the associated wheel, and means including four horizontally extending levers one operatively connected intermediate its ends with the upper end of each of said hanger levers for actuating said hanger levers in a manner to provide clasp brakes for the associated wheels.

4. In a truck brake rigging for a car truck, the combination of a plurality of hanger levers one pivotally attached to the truck frame intermediate its ends at each side of each wheel on one side of the truck and each provided at its lower end with means for frictionally engaging the associated wheel, a plurality of transversely extending levers one operatively connected intermediate its ends with the upper end of each of said hanger levers, and means for actuating said transversely extending levers to actuate said hanger levers in a manner to provide clasp brakes for the wheels.

5. In a truck brake rigging for a car truck, the combination of a plurality of hanger levers one pivotally attached to the truck frame intermediate its ends at each side of each wheel on one side of the truck and each provided at its lower end with means for frictionally engaging the associated wheel, a plurality of transversely extending levers one operatively connected intermediate its ends with the upper end of each of said hanger levers, means connected with the outer end of the transversely extending lever at one end of the truck for actuating it, an automatic slack adjuster operatively connected with the outer end of the transversely extending lever at the other end of the truck, and means operatively connecting all of said transversely extending levers in such manner that actuation of the transversely extending lever at said one end of said truck will actuate all of said transversely extending levers and thereby all of said hanger levers to provide clasp brakes for the wheels.

6. In a truck brake rigging for a car truck, a plurality of transversely extending levers one disposed on each side of each wheel at one side of the truck, a compression rod connecting the inner ends of the two levers disposed on opposite sides of each wheel, a pull rod connecting the outer ends of the levers disposed between adjacent wheels, a brake cylinder secured to the truck frame outboard of the wheels at one end of the truck and operatively connected with the outer end of the adjacent lever, a slack adjuster secured to the truck frame outboard of the wheels at the other end of the truck and operatively connected with the outer end of the adjacent lever, and a plurality of hanger levers one pivotally attached intermediate its ends to the truck frame on each side of each wheel and each provided at its lower end with means for frictionally engaging the associated wheel and each connected at its upper end with the associated transversely extending lever intermediate its ends.

EMIL G. MUELLER.